United States Patent
Maceraudi et al.

(10) Patent No.: US 10,838,036 B2
(45) Date of Patent: Nov. 17, 2020

(54) METHOD FOR DETERMINING MULTIPATH COMPONENTS OF A UWB IMPULSE CHANNEL

(71) Applicant: COMMISSARIAT A L'ENERGIE ATOMIQUE ET AUX ENERGIES ALTERNATIVES, Paris (FR)

(72) Inventors: Jimmy Maceraudi, Gardanne (FR); Francois Dehmas, Vif (FR); Benoit Denis, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 127 days.

(21) Appl. No.: 16/156,050

(22) Filed: Oct. 10, 2018

(65) Prior Publication Data
US 2019/0113599 A1 Apr. 18, 2019

(30) Foreign Application Priority Data

Oct. 13, 2017 (FR) ...................... 17 59611

(51) Int. Cl.
*G01S 5/02* (2010.01)
*H04B 1/7163* (2011.01)

(52) U.S. Cl.
CPC .......... *G01S 5/0215* (2013.01); *G01S 5/0221* (2013.01); *H04B 1/71637* (2013.01); *H04B 2201/71634* (2013.01)

(58) Field of Classification Search
CPC .... G01S 5/0215; G01S 5/0221; G01S 5/0278; H04B 1/707; H04B 1/71637
See application file for complete search history.

(56) References Cited

U.S. PATENT DOCUMENTS

| | | | |
|---|---|---|---|
| 2003/0058971 A1* | 3/2003 | Langford | G01S 3/50 375/343 |
| 2008/0042845 A1* | 2/2008 | Richards | H04B 1/7163 340/572.4 |

FOREIGN PATENT DOCUMENTS

| | | |
|---|---|---|
| EP | 1 580 901 A1 | 9/2005 |
| FR | 2 996 969 A1 | 4/2014 |

(Continued)

OTHER PUBLICATIONS

French Preliminary Search Report dated Jun. 19, 2018 in French Application 17 59611, filed on Oct. 13, 2017 (with English Translation of Categories of cited documents).

(Continued)

*Primary Examiner* — Dao L Phan
(74) *Attorney, Agent, or Firm* — Oblon, McClelland, Maier & Neustadt, L.L.P.

(57) ABSTRACT

A method for determining the multipath components of a propagation channel in a geolocation system or an IR-UWB telecommunications system. The IR-UWB emitter emits a plurality of UWB impulses at a plurality of central frequencies, sequentially or in parallel. The receiver translates the response of the channel to each of these impulses into the baseband, integrates it over a plurality of time intervals in order to provide intensity samples related to successive times of flight. The intensity samples related to the same time of flight and to the various frequencies are combined in order to provide a composite sample at the output of a multiband IR-UWB receiver module. The multipath components are determined from the composite samples exceeding a predetermined threshold value.

10 Claims, 6 Drawing Sheets

(56) References Cited

FOREIGN PATENT DOCUMENTS

WO     WO 2008/156909 A2    12/2008
WO     WO 2015/055522 A1    4/2015

OTHER PUBLICATIONS

Maceraudi, J., et al. "Multipath Components Tracking Adapted to Integrated IR-UWB Receivers for Improved Indoor Navigation", 2016 $24^{th}$ European Signal Processing Conference (EUSIPCO), 2016, 5 pages.

Maceraudi, J., et al. "Multipath-Aided Direct Path ToA Reconstruction for Integrated UWB Receivers in Generalized NLoS", 2017 IEEE $86^{th}$ Vehicular Technology Conference (VTC-Fall), 2017, 5 pages.

* cited by examiner

METHOD FOR DETERMINING MULTIPATH COMPONENTS OF A UWB IMPULSE CHANNEL

TECHNICAL FIELD

The present invention relates in general to the field of emission/reception systems of the impulse UWB (Ultra Wide Band) or IR-UWB (Impulse Response UWB) type. It has a use in particular in the field of positioning via IR-UWB beacons and more particularly for indoor positioning.

PRIOR ART

The technique of IR-UWB transmission is well known in the prior art, whether for telecommunications systems (for example under the IEEE 802.15.4a or IEEE 802.15.16 standard) or for geolocation systems, and the very short duration of the impulses allows a high positioning resolution to be obtained.

One of the factors limiting systems for UWB positionings, particularly present in an indoor environment, is the presence of multiple propagation paths, also called multipath components or MPCs.

FIG. 1A illustrates the presence of multipath components in a transmission channel between an emitter Tx and an IR-UWB receiver Rx. An impulse emitted by the emitter is reflected by objects 110, 120, 130 present in the environment, the impulse thus reflected arriving at times $t_i^{(k)}$ i=, . . . , $P^{(k)}$ where $P^{(k)}$ is the number of multipath components and k is an index representing the temporal instance of the propagation channel (hereinafter more simply called instance of the propagation channel) between the emitter Tx and the receiver Rx, as specified below. The index k can be designed as a time index indexing successive positions of the receiver with respect to the emitter (mobile receiver) or successive configurations of the environment (changing environment), or even both (mobile receiver and changing environment). The arrival times (ToAs) $t_i^{(k)}$, i=1, . . . , $P^{(k)}$, are such that $t_i^{(k)} \geq t_d^{(k)}$ where $t_d^{(k)}$ corresponds to the line-of-sight (LOS) propagation path of the instance k of the propagation channel.

FIG. 1B shows the signal received by the receiver Rx for various instances of the propagation channel (here successive positions of the receiver). The axis of the abscissae gives the time of reception (also called delay) and the axis of the ordinates gives the instance of the channel. Here, the channel (cf. FIG. 1A) is formed by four paths, a direct path and three specular paths (in other words, having been subjected to a simple reflection). The direct (or LOS) component is designated by 115. The other multipath components are designated by 125, 135 and 145. It is noted that according to the instance of the channel (here according to the position of the receiver), the various multipath components are more or less delayed with respect to the LOS path, and as a result said components can partially or totally overlap (this is called MPC collision or interference). The result of such a collision of MPCs is dependent on their waveforms and on respective phases and can lead, for example in the case of phase opposition, to the total or partial disappearance of certain MPCs in the received signal, as indicated in the drawing for channel instance no 3.

The estimation of the position of a receiver via an IR-UWB geolocation system requires in general the presence of a minimum number of emitter beacons (3 in the plane and 4 in space, but sometimes less in the presence of known reflective walls), also called bases, the positions of which are known to the receiver. Each propagation channel between a base and the receiver can be multipath in such a way that the receiver can receive a significant number of components. In such a case, the receiver can simply discriminate and use the LOS components. However, the multipath components can also be used to estimate the position of the receiver. Indeed, the presence of MPCs makes it possible, in particular if a direct path disappears (NLOS) when the receiver moves, to continue to estimate the position of the receiver without substantial degradation of the estimation error. More generally, the diversity introduced by the multipath components can be used (greater number of observables) to estimate the position of a mobile receiver in a navigation method.

A method for indoor navigation of an IR-UWB receiver, assisted by the tracking of multipath components, is described in the article by J. Maceraudi et al. titled "Multipath components tracking adapted to integrated IR-UWB receivers for improved indoor navigation" published in Proc. of 24th European Signal Processing Conference (EUSIPCO), 2016, pp. 753-757. The tracking algorithm, however, uses a complex set of multiple-hypothesis Kalman filters (MHKFs).

A method for obtaining the line-of-sight (LOS) arrival time aided by the determination of multipath components in an IR-UWB geolocation system is described in the article of J. Maceraudi et al. titled "Multipath-aided direct path ToA reconstruction for integrated UWB receivers in generalized NLoS, Proc. of 86th Vehicular Technology Conference (VTC), September 2017.

According to this method, the fading of the MPCs (caused by the collisions/interference) is partly avoided via an operation of low-pass filtering (moving average) before their detection, applied to the temporal channel response acquired by the receiver. This prefiltering, however, has the disadvantage of eliminating a portion of the useful signal and introducing a latency into the channel estimation, the system having to wait a certain number of samples before being able to return a filtered value.

In another field of use, a receiver of an IR-UWB telecommunications system uses an integration of the signal received in time intervals in order to recover the symbols transmitted. Such a receiver, further capable of operating in a plurality of possible bands, is described in the patent application FR-A-2 996 969. In such a receiver, it is necessary to determine the positions of the time intervals in which the impulses are located. In the presence of a multipath channel, it can be useful to use a rake filter (RAKE) to sum the contributions of the multipath components, which implies being able to determine them and, if necessary, track them when the receiver moves and/or when the environment changes.

In all cases, whether the receiver is part of a geolocation system or an IR-UWB telecommunications system, the determination of the multipath components must avoid, as much as possible, the interference situations mentioned above.

The object of the present invention is therefore to propose a method for determining multipath components of a propagation channel in a geolocation system or in an IR-UWB telecommunications system that allows the various multipath components to be resolved simply, even when there is interference.

DISCLOSURE OF THE INVENTION

The present invention is defined by a method for determining multipath components of a propagation channel in an IR-UWB system comprising an emitter and a receiver, characterised in that said emitter emits a plurality of UWB impulses at a plurality (N) of distinct central frequencies and in that the receiver translates the response of the channel to each of these impulses into the baseband, integrates it over time intervals in order to provide a plurality of complex samples, combines the squared moduli of the complex samples corresponding to the same time of flight and to the various central frequencies in order to obtain a composite sample at each time of flight, the multipath components of the channel being determined from the composite samples in successive times of flight, exceeding a predetermined threshold.

According to a first embodiment, said plurality of impulses is emitted in the form of a frame of successive impulses, the squared moduli of the complex samples corresponding to the same central frequency and to the various successive times of flight being stored in a buffer before the combination step.

Advantageously, the duration of the frame is chosen as less than the coherence time of the channel.

Said receiver can be for example a double-quadrature multiband receiver.

According to one embodiment, said plurality of impulses at the various central frequencies is emitted simultaneously by the emitter.

The central frequencies are for example chosen as equal to $f_c^1=3.5$ GHz, $f_c^2=4$ GHz, $f_c^3=4.5$ GHz and the bandwidth of the impulses is chosen as equal to 500 MHz.

According to an example of use, said multipath components thus determined are used to estimate the position of the receiver.

The invention also relates to a receiver suitable for implementing the method for determining multipath components of a propagation channel according to the first embodiment, said receiver comprising:
- a multiband IR-UWB receiver module suitable for receiving the response of said channel to a frame of successive UWB impulses emitted at a plurality (N) of distinct central frequencies, translating the response of said channel to each of the impulses into the baseband, integrating the signal thus translated over successive time intervals in order to provide a plurality of complex samples corresponding to successive times of flight;
- a calculation module in order to calculate the squared moduli of the complex samples thus obtained;
- a combination module in order to combine the samples corresponding to the same time of flight and to the various frequencies in order to provide a composite sample for said time of flight;
- a comparison module in order to determine the multipath components from the composite samples at the successive times of flight exceeding a predetermined threshold.

Finally, the invention relates to a receiver suitable for implementing the method for determining multipath components of a propagation channel according to the second embodiment, said receiver comprising:
- a plurality of IR-UWB receiver modules in parallel, each IR-UWB receiver module being suitable for translating, into the baseband, the response of said channel at a central frequency out of a plurality of (N) of distinct central frequencies, integrating the signal thus translated over successive time intervals in order to provide a plurality of complex samples corresponding to successive times of flight;
- a plurality of calculation modules in order to calculate the squared moduli of the complex samples respectively provided by the receiver modules;
- a combination module in order to combine the samples corresponding to the same time of flight and to the various distinct central frequencies in order to provide a composite sample for said time of flight;
- a comparison module in order to determine the multipath components from the composite samples at the successive times of flight exceeding a predetermined threshold.

The IR-UWB receiver modules can be for example of the double-quadrature type.

BRIEF DESCRIPTION OF THE DRAWINGS

Other features and advantages of the invention will be clear upon reading a preferred embodiment of the invention, made in reference to the appended drawings among which.

DETAILED DISCLOSURE OF SPECIFIC EMBODIMENTS

Figure 1A:
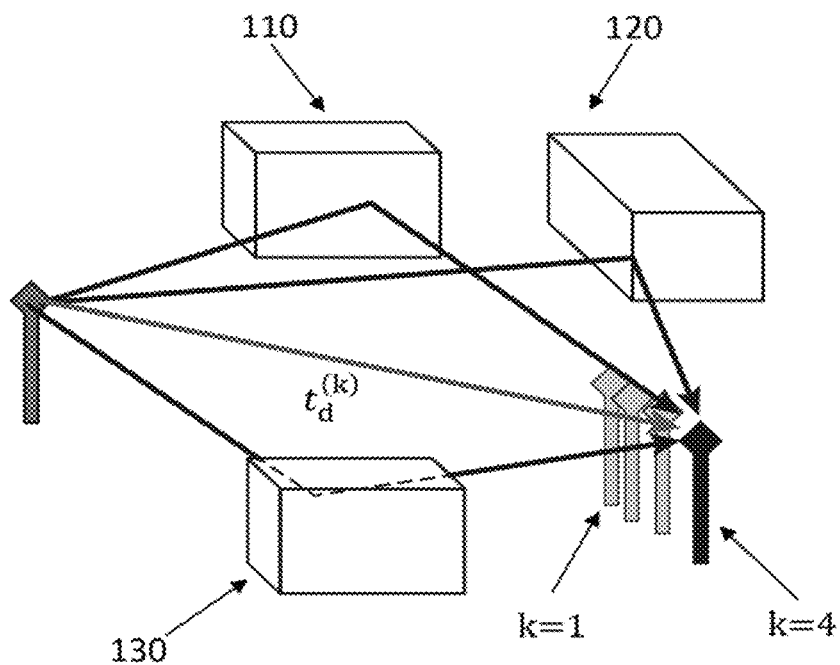
FIG. 1A, already described, shows a diagram of a multipath propagation channel between an emitter and an IR-UWB receiver.
Figure 1B:
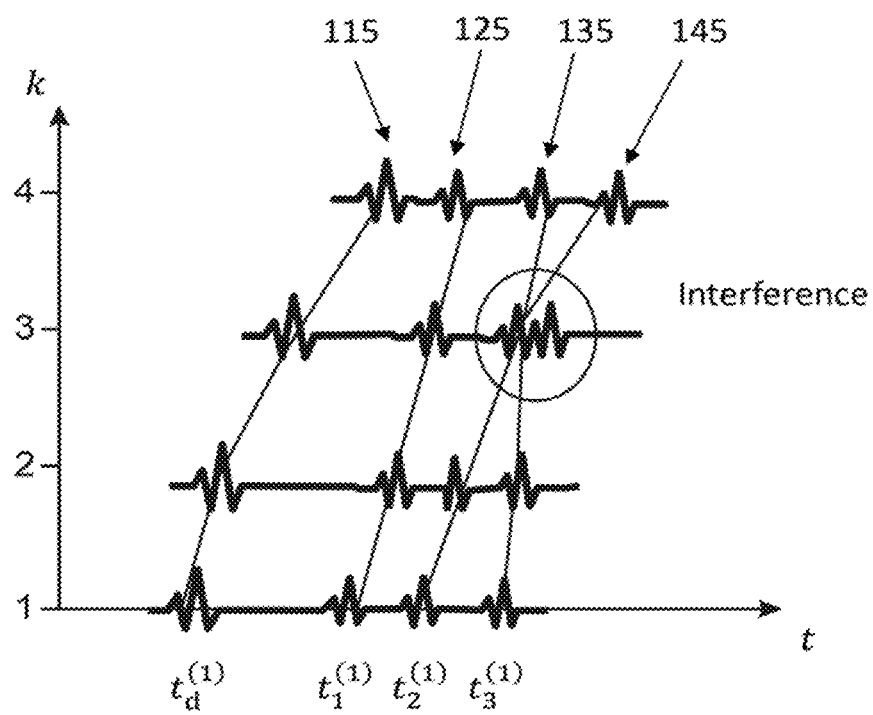
FIG. 1B, already described, shows the signal received by the receiver of FIG. 1A for various positions of the latter.

An IR-UWB system comprising at least one emitter Tx and a receiver Rx is considered below. This system can be a telecommunications system, a geolocation system as mentioned above, or even a simple system for measuring distance between the emitter and the receiver.

It is supposed that the emitter Tx is suitable for transmitting in a plurality of frequency bands, more precisely UWB impulses at a plurality of distinct central frequencies, or:

$$s_e(t, \omega_c) = A_e \cos(\omega_c(t - t_c) + \varphi)\exp\left(-\frac{(t - t_c)^2}{2T_{BW}^2}\right) \quad (1)$$

where $A_e$ is the amplitude of the impulse emitter, $$f_c = \frac{\omega_c}{2\pi}$$

is the central frequency of the impulse, which can have a plurality of values $f_c^1, \ldots, f_c^N$, $t_c$ is the time of emission corresponding to the centre of the impulse, $\varphi$ is the phase upon emission, unknown and modelled as a random variable uniformly distributed over $[0,2\pi[$, $T_{BW}$ is a duration representative of the Gaussian envelope and inversely proportional to the width of the bandwidth BW. In order to distinguish the emissions of impulses at the various temporal instances k=1, ..., K of the propagation channel, the notation $s_e^{(k)}(t,\omega_e)$ is used to indicate that the impulse was emitted at the instance k:

$$s_e^{(k)}(t,\omega_c) = A_e \cos(\omega_c(t-t_c^{(k)})+\varphi^{(k)})\exp\left(-\frac{(t-t_c^{(k)})^2}{2T_{BW}^2}\right) \quad (2)$$

where $t_c^{(k)}$ and $\varphi^{(k)}$ are, respectively, the time of emission and the phase upon emission related to the instance k of the channel.

If it is supposed that the propagation channel comprises a plurality P of multipath components (considered independently of k here in order to simplify the notation) and the same origin of the times of flight is taken (or equivalently, of the arrival times, the latter being deduced from the former via knowledge of the emission time), $t_c^{(k)}=0$ at each instance, the signal received by the receiver Rx for the instance k of the channel, is written as:

$$s_r^{(k)}(t,\omega_c) = \sum_{i=1}^{P} A_e \alpha_i^{(k)} \cos(\omega_c(t-\tau_i^{(k)})+\theta_i^{(k)}+\varphi^{(k)})\exp\left(-\frac{(t-\tau_i^{(k)})^2}{2T_{BW}^2}\right) \quad (3)$$

where $\alpha_i^{(k)}$, $\theta_i^{(k)}$ and $\tau_i^{(k)}$ are, respectively, the extinction coefficient and the phase shift introduced by the path associated with the MPC i of the channel temporal instance k.

In a multiband IR-UWB receiver like that described in the application FR-A-2 996 969, the combination of the four outputs of the double-quadrature receiver module allows the signal to be acquired in various sub-bands. For a given sub-band, the signal is decomposed over an orthogonal basis consisting of two sinusoids offset by 90° at a central frequency, then integrated over a time interval $$W_{t_s} = \left[t_s - \frac{W}{2}, t_s + \frac{W}{2}\right],$$

having a width W centred on the sampling time $t_s$, in order to provide a sample of intensity:

$$\text{bin}^{(k)}(t_s,\omega_c) = \left(\int_{W_{t_s}} s_r^{(k)}(t,\omega_c)\cos(\omega_c t)dt\right)^2 + \left(\int_{W_{t_s}} s_r^{(k)}(t,\omega_c)\sin(\omega_c t)dt\right)^2 \quad (4)$$

where $\text{bin}^{(k)}(t_s,\omega_c)$ represents the sample of intensity obtained via integration over the time interval $W_{t_s}$.

If the case of interference between two multipath components of the channel (for example two indirect paths and absence of a direct path) is now examined, the sample at the output of the receiver $\text{bin}^{(k)}(t_s,\omega_c)$ can be expressed in the following form:

$$\text{bin}^{(k)}(t_s,\omega_c) = (A_1^{(k)})^2 + (A_2^{(k)})^2 + I^{(k)}(t_s,\omega_c) \quad (5-1)$$

with $$A_1^{(k)} = A_e \alpha_1^{(k)} \int_{W_{t_s}} \exp\left(-\frac{(t-\tau_1^{(k)})^2}{2T_{BW}^2}\right)dt,$$

$$A_2^{(k)} = A_e \alpha_2^{(k)} \int_{W_{t_s}} \exp\left(-\frac{(t-\tau_2^{(k)})^2}{2T_{BW}^2}\right)dt$$

and where $I^{(k)}(t_s,\omega_c)$ is an interference term defined by:

$$I^{(k)}(t_s,\omega_t) = 2A_1^{(k)}A_2^{(k)}\cos(\omega_c(\tau_1^{(k)}-\tau_2^{(k)})-(\theta_1^{(k)}-\theta_2^{(k)})) \quad (5-2)$$

It is clear that in the expression (5-1), the terms $(A_1^{(k)})^2$ and $(A_2^{(k)})^2$ are the respective contributions of the first and of the second multipath component in the absence of interference and that the interference term $I^{(k)}(t_s,\omega_c)$ varies sinusoidally according to the difference in time of flight between the two paths of the channel.

Figure 2:
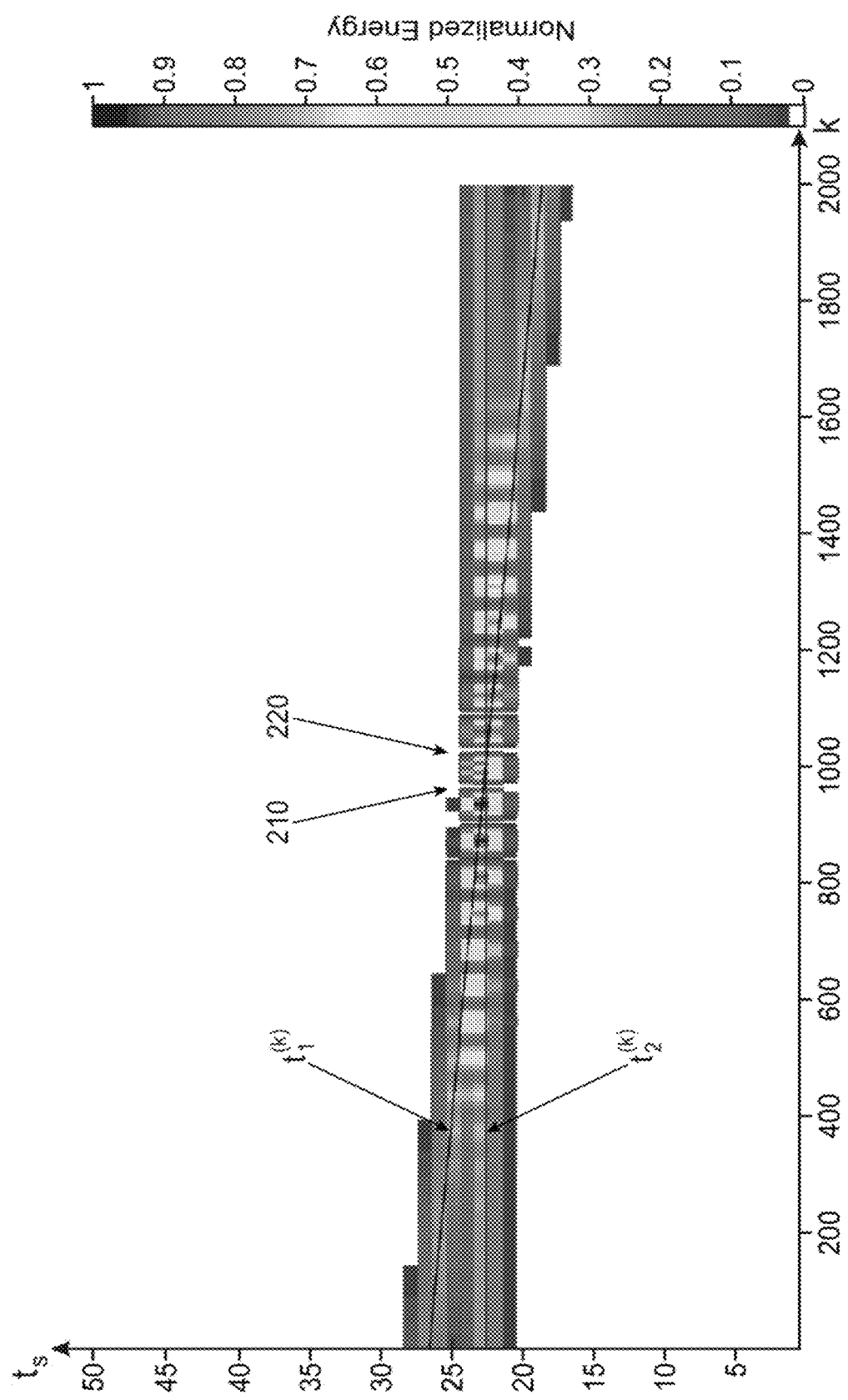
FIG. 2 shows a case of interference between two multipath components at an IR-UWB receiver.

FIG. 2 illustrates the case studied and mentioned above (simplified channel with two MPCs) by giving the intensity of the signal estimated by the IR-UWB receiver for successive instances k of the transmission channel.

The abscissae represent the successive positions of the receiver (channel instances) over time and the ordinates represent the sampling times $t_s$ (in other words, the delays in the channel response). It was supposed that the times of flight $\tau_i^{(k)}$, i=1, 2, are linearly dependent on the position of the receiver (case of a receiver moving with a constant velocity). The impulses have a central frequency of 4 GHz and a bandwidth of 500 MHz. The receiver uses integration intervals having a width of 2 ns, offset by ins. It is noted that in FIG. 2, the two components give constructive interference for certain positions of the receiver and destructive interference in others. In particular, at the positions identified by 210 and 220, a total absence of a signal is noted, corresponding to an exact superposition of the impulses received with a phase opposition between them. In these positions 210 and 220, the IR-UWB receiver does not allow the MPC components to de determined.

The idea on which the invention is based is to use IR-UWB impulses at various central frequencies and to carry out, for the same channel temporal instance, a combination of the samples relating (to the same time of flight and) to various central frequencies. Indeed, it is understood that, for a given channel temporal instance, the situation of interference between two MPCs only affects a single central frequency. In other words, instead of considering a channel temporal instance at a given central frequency, the responses of this channel are combined at the various frequencies in order to be freed from the interference.

Figure 3:
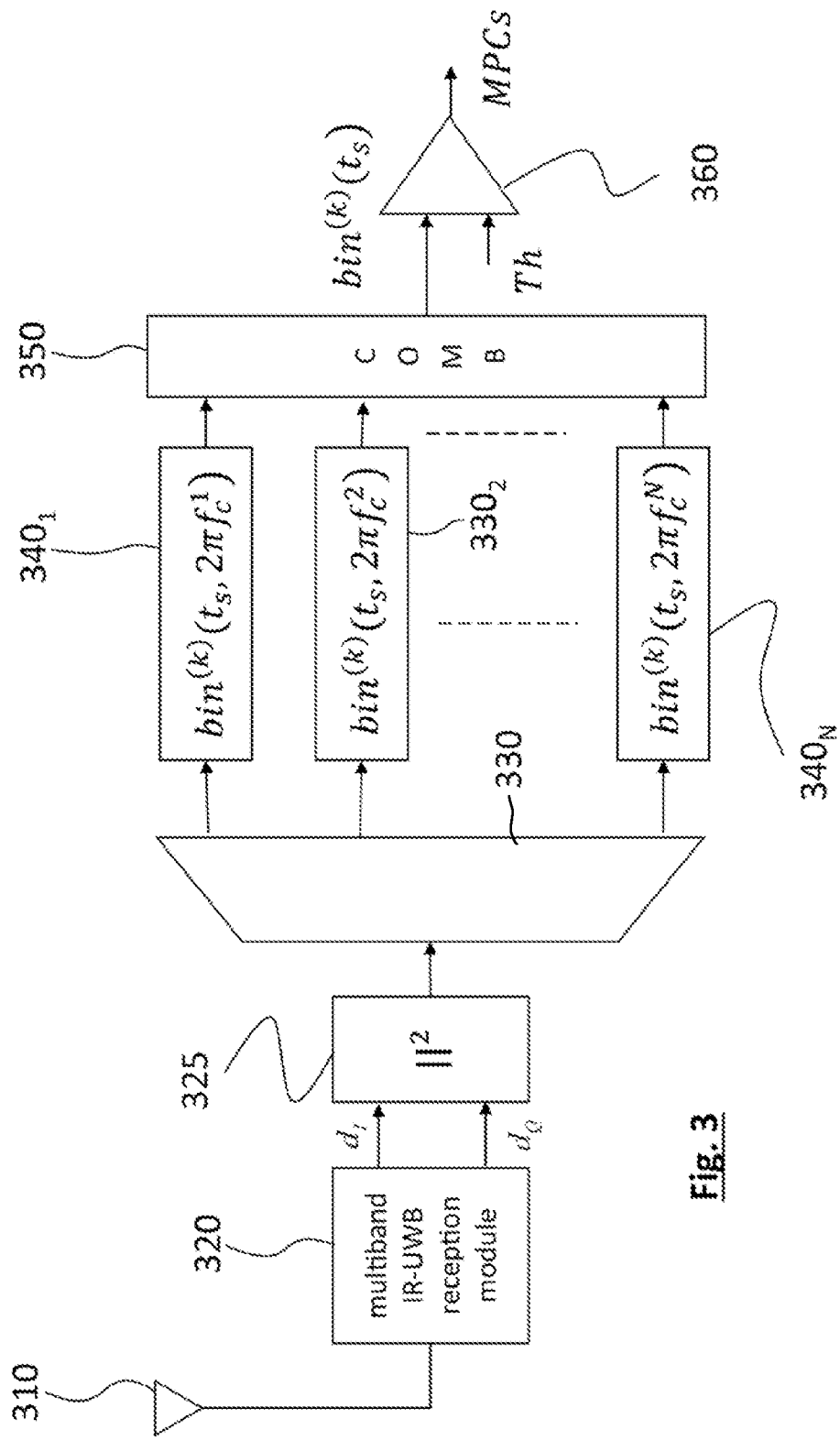
FIG. 3 shows a diagram of an IR-UWB receiver implementing a method for determining multipath components according to a first embodiment of the invention.

FIG. 3 shows a diagram of an IR-UWB receiver implementing a method for determining multipath components of a channel, according to a first embodiment of the invention.

More precisely, the receiver Rx, 300, comprises an antenna 310 and a multiband IR-UWB receiver module, 320. The receiver module 320 has a double-quadrature architecture and is advantageously configured to be able to operate in a plurality of sub-bands, as described in the application FR-A-2 996 969. In the present case, the module 320 is configured in order to be synchronised with the IR-UWB impulses at various central frequencies $f_c^1, \ldots, f_c^N$ and translate them into baseband.

It is supposed in this first embodiment that for each channel temporal instance k, the emitter Tx emits a sequence of N impulses respectively centred on the aforementioned central frequencies. The emitted signal comprises at least one frame consisting of N intervals having a duration T, an IR-UWB impulse having a central frequency $f_c^N$ being emitted during the i$^{th}$ interval. In correlation, the receiver module 320 is centred on f$_c^1$ during a first reception interval, on f$_c^2$ during a second reception interval and so on until the N$^{th}$ reception interval. It is also supposed hereinafter that NT<T$_{coh}$, that is to say, the frame length is less than the coherence time of the channel. The frame can be itself repeat at the repetition frequency 1/NT.

At each integration interval, the complex samples (d$_I$,d$_Q$) at the output of the multiband receiver module 320 are subjected to a calculation of the squared modulus, 325. The intensity samples thus obtained at the output of 325 are none other than bin$^{(k)}$(t$_s$,2πf$_c^n$), $$s = 0, \ldots, \left\lfloor \frac{T}{W} \right\rfloor,$$

where f$_c^n$ is the central frequency of the selected sub-band in the receiver, and t$_s$=sW, $$s = 0, \ldots, \left\lfloor \frac{T}{W} \right\rfloor$$

are successive times of flight from the emitter.

These samples are demultiplexed by the demultiplexer 330 into the buffers 340$_1$, . . . ,340$_n$. More precisely, the samples obtained during a reception interval corresponding to the central frequency f$_c^n$ are stored in a corresponding buffer, 340$_n$. Thus, after reception of a frame during the instance k of the channels at the various frequencies, the buffer 340$_n$ contains the samples bin$^{(k)}$(sW,2πf$_c^n$), $$s = 0, \ldots, \left\lfloor \frac{T}{W} \right\rfloor,$$

corresponding to the successive times of flight bin$^{(k)}$(t$_s$, 2πf$_c^n$), $$s = 0, \ldots, \left\lfloor \frac{T}{W} \right\rfloor.$$

The samples relating to the same time of flight and to the various central frequencies are then combined in a combination module 350 to give a composite sample:

$$bin^{(k)}(t_s) = \sum_{n=1}^{N} \lambda_n bin^{(k)}(t_s, 2\pi f_c^n) \quad (6)$$

where λ$_n$, n=1, . . . , N are predetermined weighting coefficients. For example, $$\lambda_n = \frac{1}{N}$$

can be taken in order to calculate a simple average or λ$_n$∝SNR$_n$(t$_s$) where SNR$_n$(t$_s$) is the signal-to-noise ratio at the frequency f$_c^n$ and at the time t$_s$.

By carrying out the combination of the samples bin$^{(k)}$(t$_s$, 2πf$_c^n$) according to the expression (6) for each time of flight t$_s$=sW, $$s = 0, \ldots, \left\lfloor \frac{T}{W} \right\rfloor,$$

the various MPCs components are brought to light, even if some of them disappear at certain frequencies for certain channel instances. More precisely, the comparator 360 detects the MPCs components from the composite samples bin$^{(k)}$(t$_s$), t$_s$=sW, $$s = 0, \ldots, \left\lfloor \frac{T}{W} \right\rfloor,$$

exceeding a predetermined threshold, Th.

Figure 4:
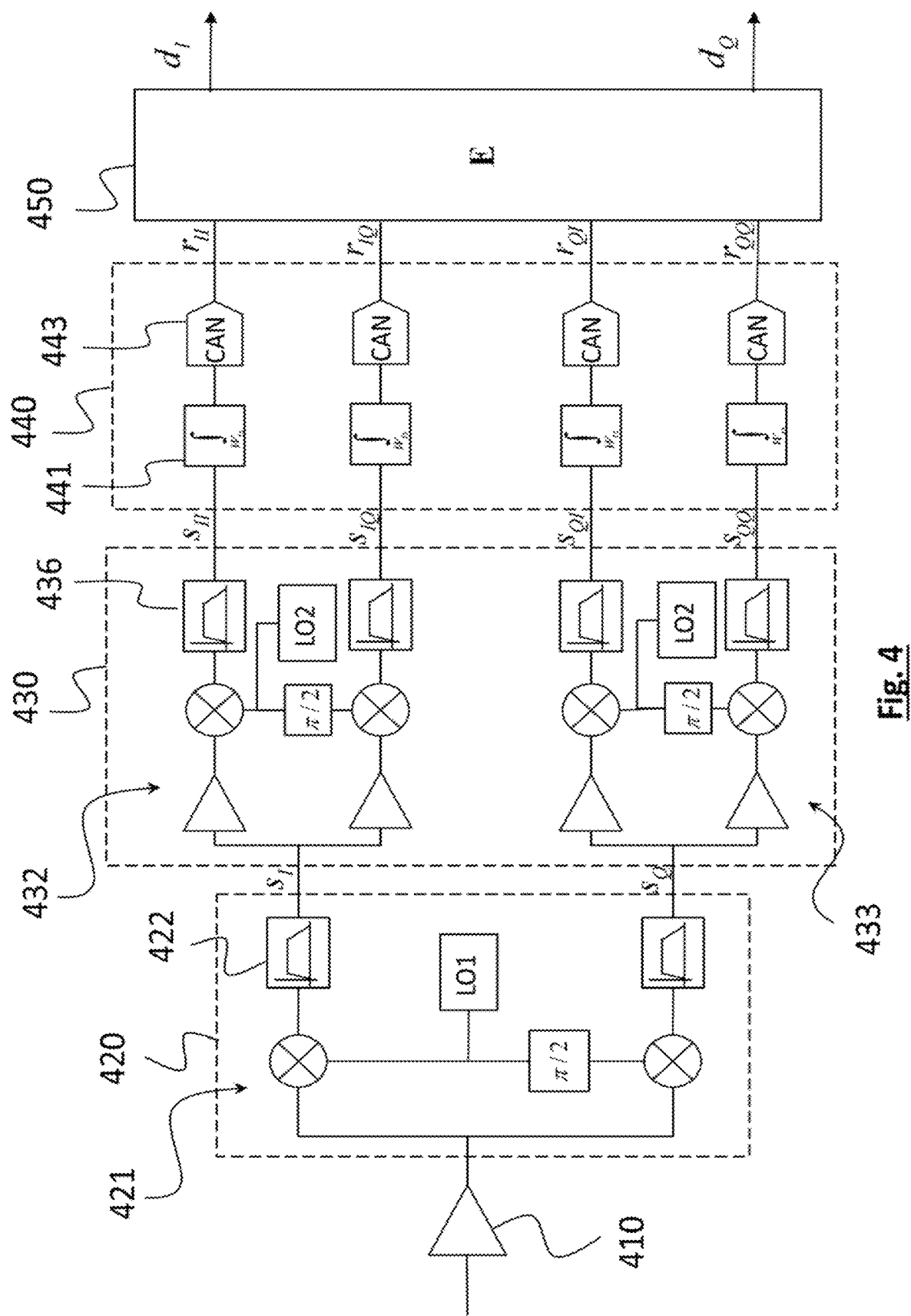
FIG. 4 shows a diagram of the structure of a receiver module that can be used in the IR-UWB receiver of FIG. 3.

FIG. 4 shows a diagram of the structure of the multiband receiver module 320 of FIG. 3.

This receiver module is described in detail in the application FR-A-2 966 969 incorporated here by reference.

The architecture of this receiver module is recalled below.

The receiver module comprises, at the input, a low noise amplifier, 410, followed by a first stage of frequency translation 420. This first stage comprises a first quadrature mixer 421, the signals of which that are offset by 90° are generated by a first local oscillator LO$_1$. This first stage, which can be shunted, allows the signal to be translated into the baseband or offset to an intermediate frequency. The signals that are in phase and offset by 90°, s$_I$,s$_Q$, are filtered via the low-pass filters 422. The signals thus filtered pass into a second quadrature stage 430, comprising a second quadrature mixer 432 on the in-phase path and a third quadrature mix 433 on the quadrature path. The signals offset by 90° are generated by a second local oscillator LO$_2$. The in-phase and quadrature outputs of the second quadrature mixer, s$_{II}$,s$_{IQ}$, are filtered by low-pass filters 436. Likewise, the in-phase and quadrature outputs of the third quadrature mixer, s$_{QI}$,s$_{QQ}$, are filtered by low-pass filters 436. The signals at the output of the second stage (which can also be shunted) are integrated over successive time intervals W having a width W in the integrators 441. The results of integration for the various paths are then digitised in the analogue/digital converters 443 and combined in the combination stage 450, in order to provide complex samples (d$_I$,d$_Q$):

$$\begin{pmatrix} d_I \\ d_Q \end{pmatrix} = \begin{pmatrix} \varepsilon_{II}^I & \varepsilon_{IQ}^I & \varepsilon_{QI}^I & \varepsilon_{QQ}^I \\ \varepsilon_{II}^Q & \varepsilon_{IQ}^Q & \varepsilon_{QI}^Q & \varepsilon_{QQ}^Q \end{pmatrix} \begin{pmatrix} r_{II} \\ r_{IQ} \\ r_{QI} \\ r_{QQ} \end{pmatrix} \quad (7)$$

where the elements of the matrix $$E = \begin{pmatrix} \varepsilon_{II}^I & \varepsilon_{IQ}^I & \varepsilon_{QI}^I & \varepsilon_{QQ}^I \\ \varepsilon_{II}^Q & \varepsilon_{IQ}^Q & \varepsilon_{QI}^Q & \varepsilon_{QQ}^Q \end{pmatrix}$$

are chosen from {−1,0,+1} according to the desired subband and r$_{II}$,r$_{IQ}$,r$_{QI}$,r$_{QQ}$ are the results of integration respectively provided by the paths II,IQ,QI,QQ. The sets of combination coefficients (elements of the matrix E) are provided to the combination stage 450 at the frequency 1/T, the sequence of the sets of coefficients having been previously synchronised with the sequence of central frequencies, $f_c^1, \ldots, f_c^N$ (for example via a pilot sequence).

Figure 5:
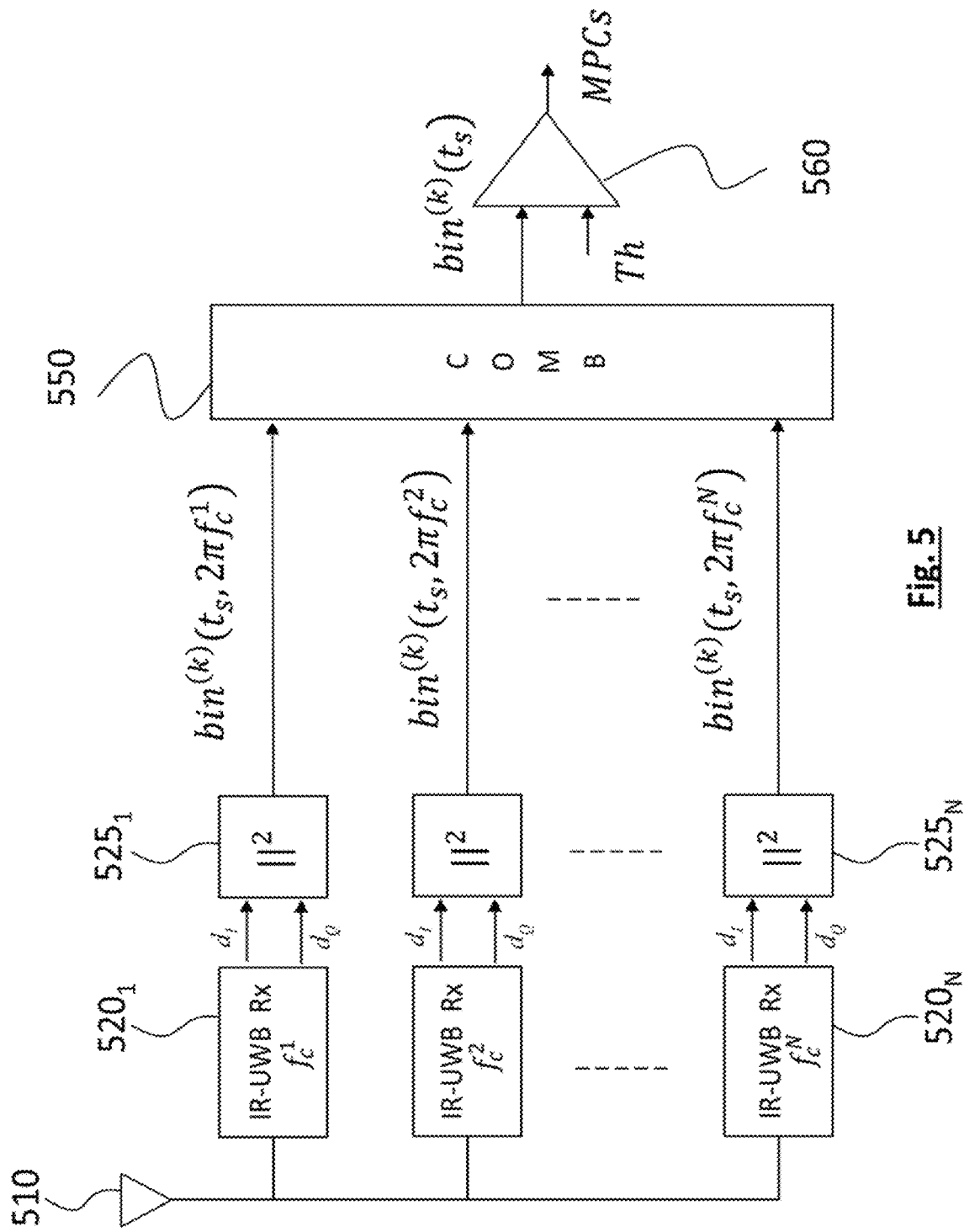
FIG. 5 shows a diagram of an IR-UWB receiver implementing a method for determining multipath components according to a second embodiment of the invention.

FIG. 5 shows a diagram of an IR-UWB receiver implementing a method for determining the multipath components of a channel, according to a second embodiment of the invention.

It is supposed in this second embodiment that for each channel temporal instance k, the emitter Tx emits N impulses in parallel respectively centred on the central frequencies $f_c^1, \ldots, f_c^N$. This emission in parallel can be repeated during the same channel instance at a frequency greater than $1/T_{coh}$.

The signal received by the antenna 510 is provided to a plurality of N IR-UWB receivers, $520_1, \ldots, 520_N$, respectively operating at the central frequencies $f_c^1, \ldots, f_c^N$, for example double-quadrature receivers as described in the application EP-A-1 580 901, the first stage of these receivers respectively translating the N impulses into a baseband. Advantageously, the low noise amplifier (LNA) upstream of the first stage of these receivers can be shared by them.

At each integration interval having an index s, the complex samples $(d_I, d_Q)$ at the output of the multiband receiver module $520_n$ are subjected to a calculation of the squared modulus in the quadratic module $525_n$. The samples thus obtained at the output of $525_n$ are none other than $bin^{(k)}(t_s, 2f_c^n)$, $$s = 0, \ldots, \left\lfloor \frac{T}{W} \right\rfloor$$

where $t_s = sW$, $$s = 0, \ldots, \left\lfloor \frac{T}{W} \right\rfloor$$

are successive times of flight from the emitter.

The samples $bin^{(k)}(t_s, 2\pi f_c^n)$ related to the same sampling time $t_s$ and to the various central frequencies $f_c^1, \ldots, f_c^N$ are combined via a combination module 550, identical to the combination module 350 described above, carrying out a combination according to the expression (6) with the same variants. The result of the combination is a sequence of composite samples $bin^{(k)}(t_s)$, sW, $$s = 0, \ldots, \left\lfloor \frac{T}{W} \right\rfloor.$$

Finally, the comparator 560 detects the MPCs components from the composite samples exceeding a predetermined threshold, Th.

Figure 6A:
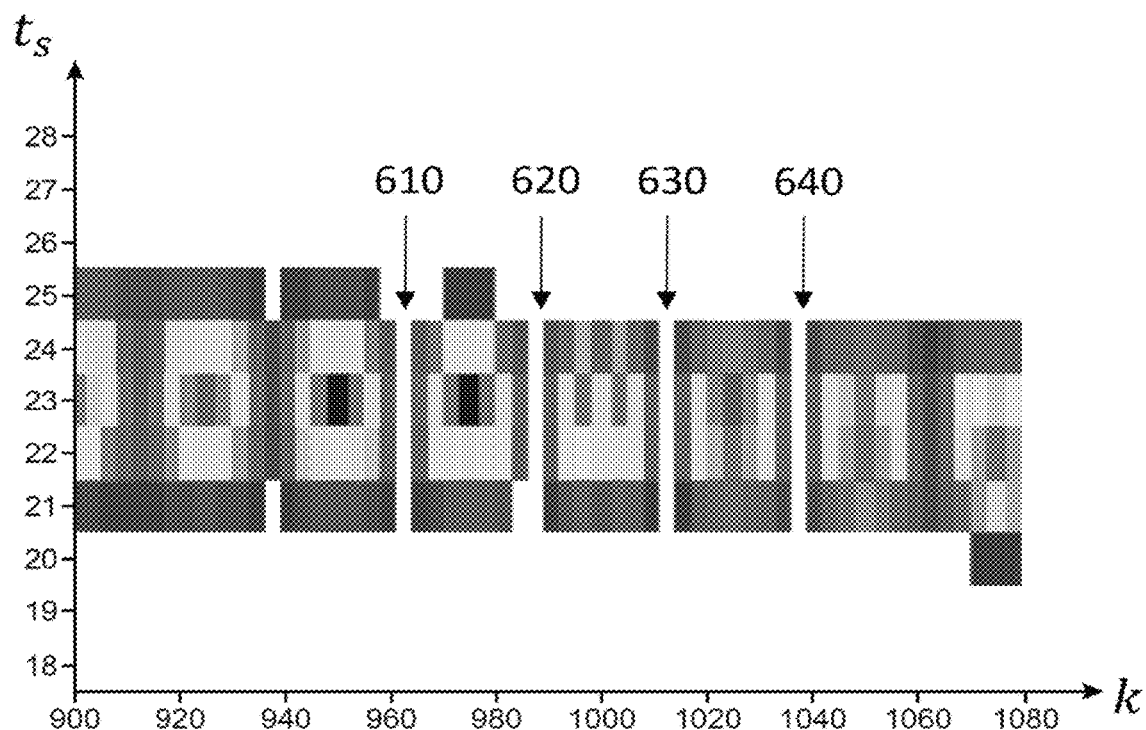
FIG. 6A is an enlargement of FIG. 2 around the point at which the interference between the two multipath components appears.

FIG. 6A illustrates a situation of interference between two paths of an IR-UWB channel. It corresponds to an enlargement of FIG. 2 around the point at which the interference appears. It is clear that the two multipath components disappear in the zones 610, 620, 630, 640 corresponding to a temporal overlap and a phase opposition of the two impulses. It is recalled that the central frequency is 4 GHz, that the bandwidth of the impulses is 500 MHz and that the signal received is integrated over intervals 2 ns wide, offset by ins.

Figure 6B:
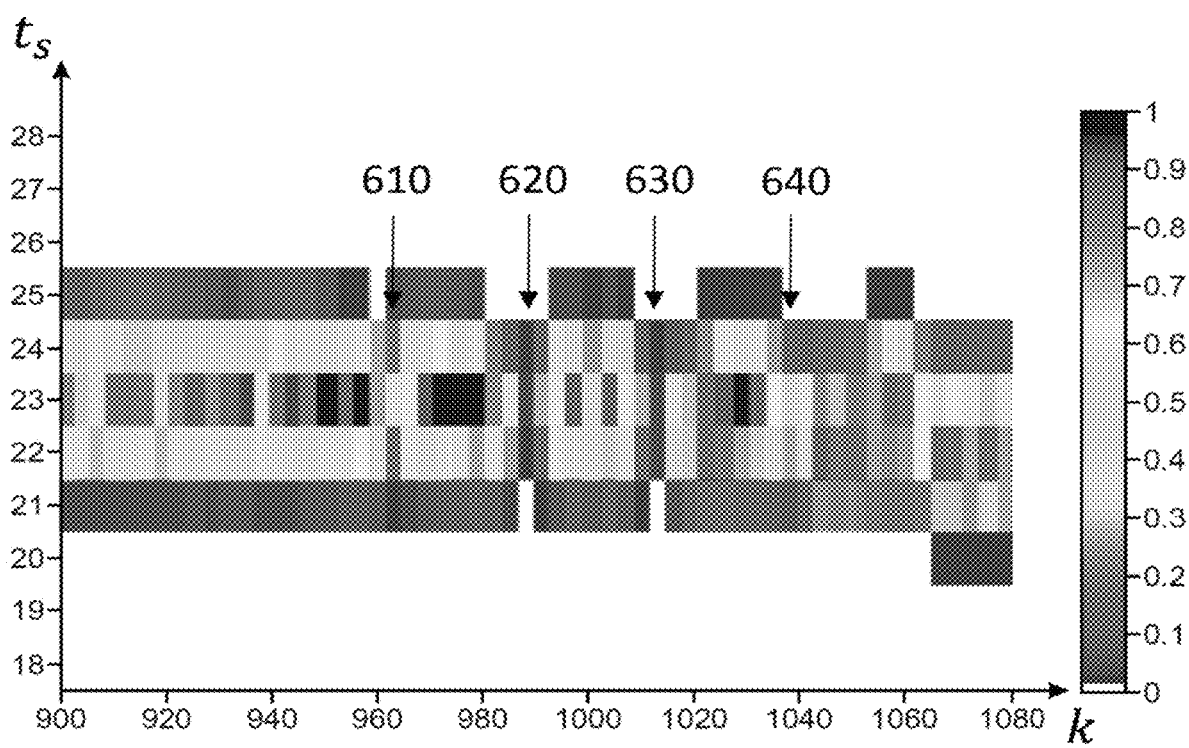
FIG. 6B shows the same multipath components after processing of the interference in the receiver of FIG. 3.

FIG. 6B shows the intensity of the signal after processing of the interference in the receiver of FIG. 3. The channel has the same two paths as in FIG. 6A. In this example, the frequency of the local oscillator, $LO_1$, of the first quadrature stage of the multiband receiver module was chosen as equal to 4 GHz, and the frequency of the local oscillator, $LO_2$, of the second quadrature stage was chosen as equal to 500 MHz. It is thus possible, by combining the outputs of the double-quadrature paths, II,IQ,QI,QQ in the combination stage 450, to select the reception sub-bands centred around the central frequencies $f_c^1 = 3.5$ GHz, $f_c^2 = 4$ GHz, $f_c^3 = 4.5$ GHz.

The combination module 350 of the receiver then calculates the average:

$$bin^{(k)}(t_s) = \frac{1}{3} \sum_{n=1}^{3} bin^{(k)}(t_s, 2\pi f_c^n) \qquad (8)$$

It is noted than in FIG. 6B, the composite samples no longer have the phenomenon of extinction in the zones 610, 620, 630, 640 and the two paths of the channel can still be identified therein by the determination method. It is thus possible to track the two multipath components, including in these zones, for example in order to assist an IR-UWB geolocation method.

The invention claimed is:

1. A method for determining multipath components of a propagation channel in an Impulse Radio Ultra-Wideband (IR-UWB) system comprising an emitter and a receiver, wherein said emitter emits a plurality of UWB impulses at a plurality of distinct central frequencies and wherein the receiver translates a response of the channel to each of these impulses into baseband, integrates it over time intervals in order to provide a plurality of complex samples, combines squared moduli of the complex samples corresponding to a same time of flight and to the central frequencies in order to obtain a composite sample at each time of flight, the multipath components of the channel being determined from the composite samples in successive times of flight, exceeding a predetermined threshold.

2. The method for determining multipath components of a propagation channel in an IR-UWB system according to claim 1, wherein said plurality of UWB impulses is emitted in a form of a frame of successive impulses, the squared moduli of the complex samples corresponding to a same central frequency and to various successive times of flight being stored in a buffer before the combination of the squared moduli of the complex samples.

3. The method for determining multipath components of a propagation channel in an IR-UWB system according to claim 1, wherein duration of the frame is chosen as less than a coherence time of the channel.

4. The method for determining multipath components of a propagation channel in an IR-UWB system, according to claim 1, wherein said receiver is a double-quadrature multiband receiver.

5. The method for determining multipath components of a propagation channel in an IR-UWB system according to claim 1, wherein said plurality of UWB impulses at the central frequencies is emitted simultaneously by the emitter.

6. The method for determining multipath components of a propagation channel in an IR-UWB system, according to claim 1, wherein the central frequencies are $f_c^1 = 3.5$ GHz, $f_c^2 = 4$ GHz, $f_c^3 = 4.5$ GHz and a bandwidth of the impulses is 500 MHz.

7. The method for determining multipath components of a propagation channel in an IR-UWB system, according to claim 2, wherein said multipath components thus determined are used to estimate a position of the receiver.

8. A receiver suitable for implementing the method for determining multipath components of a propagation channel according to claim 1, comprising:
- a multiband IR-UWB receiving circuit configured to receive the response of said channel to a frame of successive UWB impulses emitted at a plurality of distinct central frequencies, to translate the response of said channel to each of the impulses into the baseband, to integrate a signal thus translated over successive time intervals in order to provide a plurality of complex samples corresponding to successive times of flight;
- a calculation circuit configured to calculate the squared moduli of the complex samples thus obtained;
- a combiner configured to combine the complex samples corresponding to the same time of flight and to the frequencies in order to provide a composite sample for said time of flight;
- a comparison circuit configured to determine the multipath components from the composite samples at the successive times of flight exceeding a predetermined threshold.

9. The receiver suitable for implementing the method for determining multipath components of a propagation channel according to claim 8, comprising:
- a plurality of IR-UWB receiving circuits in parallel, each IR-UWB receiving circuit being configured to translate into the baseband, the response of said channel at a central frequency out of a plurality of distinct central frequencies, to integrate a signal thus translated over successive time intervals in order to provide a plurality of complex samples corresponding to successive times of flight;
- a plurality of calculating circuits configured to calculate the squared moduli of the complex samples respectively provided by the receiving circuits;
- a combiner configured to combine the complex samples corresponding to the same time of flight and to the distinct central frequencies in order to provide a composite sample for said time of flight;
- a comparison circuit configured to determine the multipath components from the composite samples at the successive times of flight exceeding a predetermined threshold.

10. The receiver suitable for implementing the method for determining multipath components of a propagation channel according to claim 9, wherein the IR-UWB receiving circuits are of double-quadrature type.

* * * * *